United States Patent
Wu et al.

(10) Patent No.: US 11,190,008 B1
(45) Date of Patent: Nov. 30, 2021

(54) CAPACITANCE PRE-CHARGING

(71) Applicants:Hunter Wu, Santa Clara County, CA (US); Hamza W. Derbas, Menlo Park, CA (US); Paul Firehammer, Saline, MI (US); Robert J. Kromer, San Francisco, CA (US)

(72) Inventors: Hunter Wu, Santa Clara County, CA (US); Hamza W. Derbas, Menlo Park, CA (US); Paul Firehammer, Saline, MI (US); Robert J. Kromer, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 24 days.

(21) Appl. No.: 16/815,279

(22) Filed: Mar. 11, 2020

Related U.S. Application Data

(60) Provisional application No. 62/823,739, filed on Mar. 26, 2019.

(51) Int. Cl.
 *H02H 9/00* (2006.01)
 *H02H 1/06* (2006.01)
 *H02H 1/04* (2006.01)

(52) U.S. Cl.
 CPC ............ *H02H 9/001* (2013.01); *H02H 1/043* (2013.01); *H02H 1/063* (2013.01)

(58) Field of Classification Search
 CPC ........ H02H 9/001; H02H 9/002; H02H 1/043; H02H 1/063
 USPC ........................................................ 323/282
 See application file for complete search history.

(56) References Cited

U.S. PATENT DOCUMENTS

| | | | |
|---|---|---|---|
| 6,956,411 B1 | 10/2005 | Holloway | |
| 7,049,825 B2 | 5/2006 | Carruthers | |
| 7,400,116 B2 | 7/2008 | Kato et al. | |
| 9,007,066 B2 | 4/2015 | Sufrin-Disler et al. | |
| 9,825,273 B2 | 11/2017 | Dulle | |
| 9,923,470 B2 | 3/2018 | Jimenez Pino et al. | |
| 9,925,878 B2 * | 3/2018 | Hashim | B60L 50/50 |
| 9,931,949 B2 | 4/2018 | Loftus et al. | |
| 9,977,065 B2 | 5/2018 | Miret et al. | |
| 2005/0007047 A1 | 1/2005 | Strothmann et al. | |
| 2006/0071557 A1 | 4/2006 | Osawa et al. | |
| 2007/0159007 A1 | 7/2007 | King et al. | |
| 2008/0092258 A1 | 4/2008 | Clarke et al. | |
| 2012/0286589 A1 * | 11/2012 | Kostovic | H01H 33/596 307/115 |
| 2015/0061376 A1 * | 3/2015 | Hartl | B60L 3/0046 307/9.1 |
| 2015/0084404 A1 | 3/2015 | Hashim et al. | |
| 2015/0251542 A1 * | 9/2015 | Mensah-Brown | B60L 50/51 307/10.1 |
| 2016/0254783 A1 | 9/2016 | Unru et al. | |

(Continued)

*Primary Examiner* — Yemane Mehari
(74) *Attorney, Agent, or Firm* — Young Basile Hanlon & MacFarlane, P.C.

(57) ABSTRACT

A high-voltage DC floating system includes a source, a power rail, a power bus, a load, and a pre-charge circuit. The power bus includes a positive bus portion and a negative bus portion. The pre-charge circuit includes a first pre-charge circuit portion that is configured to equalize a voltage across the positive power supply switch between the source and a Y-capacitance of the load and a second pre-charge circuit portion that defines a switched path to ground that is configured to equalize a voltage associated with a Y-capacitance of the negative power rail.

23 Claims, 4 Drawing Sheets

(56) References Cited

U.S. PATENT DOCUMENTS

| | | |
|---|---|---|
| 2017/0133837 A1* | 5/2017 | Hasan .................... B60L 50/30 |
| 2017/0174087 A1 | 6/2017 | El-Barbari et al. |
| 2017/0256974 A1 | 9/2017 | Baker |
| 2018/0043783 A1 | 2/2018 | Tabatowski-Bush et al. |
| 2018/0043847 A1 | 2/2018 | Burkman et al. |
| 2018/0241303 A1 | 8/2018 | Rivera et al. |
| 2018/0316279 A1* | 11/2018 | Imura .................... H02M 1/36 |

\* cited by examiner

CAPACITANCE PRE-CHARGING

CROSS-REFERENCE TO RELATED APPLICATION(S)

This application claims the benefit of U.S. Provisional Application No. 62/823,739, filed on Mar. 26, 2019. The content of the foregoing application is incorporated herein by reference in its entirety for all purposes.

FIELD

The present disclosure relates generally to the field of capacitance pre-charging.

BACKGROUND

Abruptly closing a voltage source into a large capacitance can result in a large current overshoot. A current overshoot means that the magnitude of the current briefly exceeds its final steady-state value. A current overshoot can cause electromagnetic interference (EMI) problems, or can damage connected components. To avoid large current overshoots, it is known to use pre-charge circuits that equalize the voltage between a voltage source and a voltage across a load capacitance. Some pre-charge circuits are complex and multiple pre-charge circuits may be included in a device. This can add significant complexity and size.

SUMMARY

One aspect of the disclosure is a high-voltage DC floating system that includes a source, a positive power rail that is connected to the source, a negative power rail that is connected to the source, and a power bus having a positive bus portion that is connected to the positive power rail and a negative bus portion that is connected to the negative power rail. The positive bus portion of the power bus includes a positive power supply switch that has an open position and a closed position. The negative bus portion of the power bus includes a negative power supply switch that has an open position and a closed position. A load is connected to the power bus such that the load receives electrical power from the source when the positive power supply switch and the negative power supply switch are in their closed positions. A pre-charge circuit includes a first pre-charge circuit portion that is configured to equalize a voltage across the positive power supply switch between the source and a Y-capacitance of the load and a second pre-charge circuit portion that defines a switched path to ground that is configured to equalize a voltage associated with a Y-capacitance of the negative power rail.

The first pre-charge circuit portion may include a first pre-charge resistor that is connected in series with a first pre-charge switch. The first pre-charge circuit portion may be connected to the positive bus portion of the power bus upstream from the positive power supply switch and downstream from the positive power supply switch. The switched path to ground may be electrically connected to the negative power rail. The second pre-charge circuit portion may include a second pre-charge resistor that is connected in series with a second pre-charge switch.

In some implementations of the high-voltage DC floating system, the first pre-charge circuit portion includes a first pre-charge resistor that is connected in series with a first pre-charge switch, the first pre-charge circuit portion is connected to the positive bus portion of the power bus upstream from the positive power supply switch and downstream from the positive power supply switch, the switched path to ground is electrically connected to the negative power rail, and the second pre-charge circuit portion includes a second pre-charge resistor that is connected in series with a second pre-charge switch.

In some implementations of the high-voltage DC floating system, the second pre-charge circuit portion includes a controller, a current source, a second pre-charge switch, and a second pre-charge resistor, wherein the controller is operable to measure a voltage difference and control the second pre-charge switch to apply electrical current from the current source based on the voltage difference to equalize the voltage associated with the Y-capacitance of the negative power rail.

Another aspect of the disclosure is a high-voltage DC floating system that includes a source, a power rail that is connected to the source, a power bus that is connected to the power rail, a load, and a pre-charge circuit. The load is connected to the power bus. The power bus is switchable between an activated state in which the load receives electrical power from the source and a deactivated state in which the load does not receive the electrical power from the source. The pre-charge circuit is operable to equalize a voltage associated with a Y-capacitance of the power rail and includes a switched path to ground.

The switched path to ground may be electrically connected to the power rail. In one implementation, the power rail may include a positive rail portion and a negative rail portion, and the switched path to ground may be connected to the negative rail portion of the power rail. In another, implementation, the power rail may include a positive rail portion and a negative rail portion, and the switched path to ground may be connected to the positive rail portion of the power rail. The switched path to ground may include a pre-charge resistor that is connected in series with a pre-charge switch. The switched path to ground may include a controller, a current source, a second pre-charge switch, and a second pre-charge resistor, wherein the controller is operable to measure a voltage difference and control the second pre-charge switch to apply electrical current from the current source based on the voltage difference to equalize the voltage associated with the Y-capacitance of the power rail.

In some implementations of the high-voltage DC floating system, the power bus has a positive bus portion and a negative bus portion, the positive bus portion includes a positive power supply switch and the negative bus portion includes a negative power supply switch. In such an implementation, the pre-charge circuit includes a first pre-charge circuit portion that equalizes a voltage across the positive power supply switch and a Y-capacitance of the load and a second pre-charge circuit portion that includes the switched path to ground. In addition, the first pre-charge circuit portion may include a first pre-charge resistor that is connected in series with a first pre-charge switch. The first pre-charge circuit portion may be connected to the positive bus portion of the power bus upstream from the positive power supply switch and downstream from the positive power supply switch. The second pre-charge circuit portion may include the switched path to ground, and the switched path to ground may be electrically connected to the power rail. The switched path to ground may include a second pre-charge resistor that is connected in series with a second pre-charge switch.

Another aspect of the disclosure is a method for operating a high-voltage DC floating system. The method includes controlling operation of a bi-directional load to equalize a voltage across a power supply switch between a source and a Y-capacitance of the bi-directional load while the power supply switch is in an open position, determining that the Y-capacitance of the bi-directional load has dropped below a threshold value, and moving the power supply switch from the open position to a closed position in which electrical power is supplied to the load from the source in response to determining that the Y-capacitance of the bi-directional load has dropped below the threshold value.

DETAILED DESCRIPTION

The disclosure herein relates to circuit configurations that reduce the number of pre-charge circuits that are required to pre-charge Y-capacitance in a high-voltage floating DC system. A floating DC system lacks a direct connection to a ground. Y-capacitance is a capacitance between the circuit and a ground. In a high-voltage floating DC system, Y-capacitance can be present between the circuit and a chassis or other structure that acts as a ground despite the lack of a direct connection.

Floating DC systems have gained popularity in applications like electric vehicles, electric trains and electric ships. One characteristic of floating DC systems that has contributed to their wide use for certain applications is that at least two points of failure must be present before there are electric shock hazards. In such a floating DC system, a positive high-voltage power rail and a negative high-voltage power rail have high impedance to earth/chassis. Any single point of failure from the positive high-voltage power rail or the negative high-voltage power rail to earth/chassis maintains a safe system to operate and does not cause overcurrent or shorting, which could shut down the whole system as compared to single side referenced systems. Typically, a floating DC system includes an isolation monitor that checks for loss of isolation and alerts an operator when loss of isolation is detected.

Figure 1:
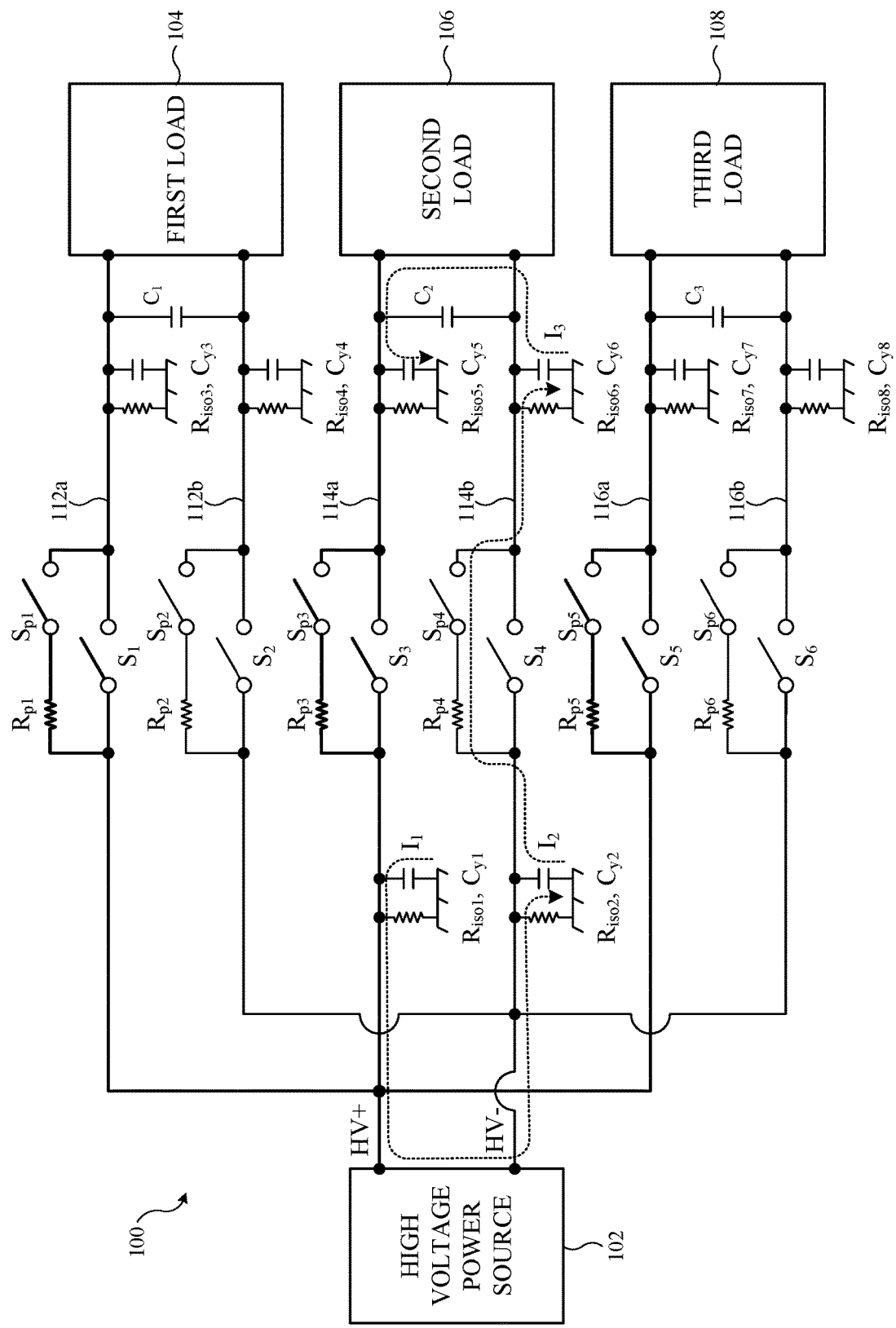
FIG. 1 is a diagram that shows an example of a known configuration for a floating DC system.

FIG. 1 is a diagram that shows a system 100, which is an example of a known configuration for a floating DC system. The system 100 includes a high-voltage power source 102, a first load 104, a second load 106, and a third load 108. The high-voltage power source 102 outputs electrical power using a positive high-voltage power rail HV+ and a negative high-voltage power rail HV−.

Each of the first load 104, the second load 106, and the third load 108 is connected to the positive high-voltage power rail HV+ and the negative high-voltage power rail HV− by an independent power bus. By way of the independent power buses, the first load 104, the second load 106, and the third load 108 are connected to the positive high-voltage power rail HV+ and the negative high-voltage power rail HV− in parallel.

A first power bus includes a first positive bus 112a and a first negative bus 112b and connects the first load 104 to the positive high-voltage power rail HV+ and the negative high-voltage power rail HV−. A second power bus includes a second positive bus 114a and a second negative bus 114b and connects the second load 106 to the positive high-voltage power rail HV+ and the negative high-voltage power rail HV−. A third power bus includes a third positive bus 116a and a third negative bus 116b and connects the third load 108 to the positive high-voltage power rail HV+ and the negative high-voltage power rail HV−.

The power buses allow the supply of power to each of the first load 104, the second load 106, and the third load 108 to be controlled independently. To control supply of power to the first load 104, the first positive bus 112a includes a supply switch $S_1$ that is connected to the positive high-voltage power rail HV+ and the first negative bus 112b includes a supply switch $S_2$ that is connected to the negative high-voltage power rail HV−. To control supply of power to the second load 106, the second positive bus 114a includes a supply switch $S_3$ that is connected to the positive high-voltage power rail HV+ and the second negative bus 114b includes a supply switch $S_4$ that is connected to the negative high-voltage power rail HV−. To control supply of power to the third load 108, the third positive bus 116a includes a supply switch $S_5$ that is connected to the positive high-voltage power rail HV+ and the third negative bus 116b includes a supply switch $S_6$ that is connected to the negative high-voltage power rail HV−.

The system 100 is a floating DC system that does not include a direct path to ground. High impedance paths to ground are present on both sides of the supply switches $S_1$-$S_6$. The positive bus HV+ has an isolation resistance $R_{iso1}$ and a parasitic capacitance $C_{y1}$. The negative bus HV+ has an isolation resistance $R_{iso2}$ and a parasitic capacitance $C_{y2}$. The first positive bus 112a has an isolation resistance $R_{iso3}$ and a parasitic capacitance $C_{y3}$. The first negative bus 112a has an isolation resistance $R_{iso4}$ and a parasitic capacitance $C_{y4}$. The second positive bus 112a has an isolation resistance $R_{iso5}$ and a parasitic capacitance $C_{y5}$. The second negative bus 112a has an isolation resistance $R_{iso6}$ and a parasitic capacitance $C_{y6}$.

The first load 104, the second load 106, and the third load 108 have capacitances $C_1$-$C_3$. Thus, pre-charging is needed to initialize the first bus, the second bus, and the third bus before connecting them to the high-voltage power source 102. To initialize each of these independent buses, pre-charge circuits are used.

Due to the parasitic Y-capacitances $C_{y1}$-$C_{y8}$ and the isolation resistances $R_{iso1}$-$R_{iso8}$, Y-capacitance pre-charge circuits are used to equalize the voltage potential of these capacitors. For the first positive bus 112a, a pre-charge resistor $R_{p1}$ and a pre-charge switch $S_{p1}$ are connected in series with one another and in parallel with the supply switch $S_1$ that connects and disconnects the first load 104 with respect to the positive high-voltage power rail HV+. For the first negative bus 112b, a pre-charge resistor $R_{p1}$ and a pre-charge switch $S_{p1}$ are connected in series with one another and in parallel with the supply switch $S_2$ that connects and disconnects the first load 104 with respect to the negative high-voltage power rail HV−. Similar components are included in the second bus and the third bus, including pre-charge resistors $R_{p3}$-$R_{p6}$ and pre-charge switches $S_{p3}$-$S_{p6}$.

Pre-charging is performed by first closing the pre-charge switch $S_{p2}$, $S_{p4}$, $S_{p6}$ that corresponds to the power supply switch $S_2$, $S_4$, $S_6$ of the respective one of the first negative bus 112b, the second negative bus 114b, or the third negative bus 116b for the respective one of the first load 104, the second load, 106, or the third load 108 that is being activated. The voltage difference associated with the capacitance is allowed to pre-charge prior to closing the corresponding power supply switch $S_2$, $S_4$, $S_6$. For example, with reference to the second power bus, current flows according to a first current path $I_1$ from parasitic capacitance $C_{y1}$ to parasitic capacitance $C_{y2}$, along a second current path $I_2$ from parasitic capacitance $C_{y2}$ to parasitic capacitance $C_{y6}$ by way of the pre-charge switch $S_{p4}$, and along a third current path $I_3$ from parasitic capacitance $C_{y6}$ to parasitic capacitance $C_{y5}$ by way of the second load 106. After closing the corresponding power supply switch $S_2$, $S_4$, $S_6$, the pre-charge switch $S_{p1}$, $S_{p3}$, $S_{p5}$ that corresponds to the power supply switch $S_1$, $S_3$, $S_3$ of the respective one of the first positive bus 112a, the second positive bus 114a, or the third positive bus 116a for the respective one of the first load 104, the second load, 106, or the third load 108 that is being activated is closed, and the capacitance is allowed to pre-charge prior to closing the corresponding power supply switch $S_1$, $S_3$, $S_5$, at which point power supply to the downstream load commences.

Figure 2:
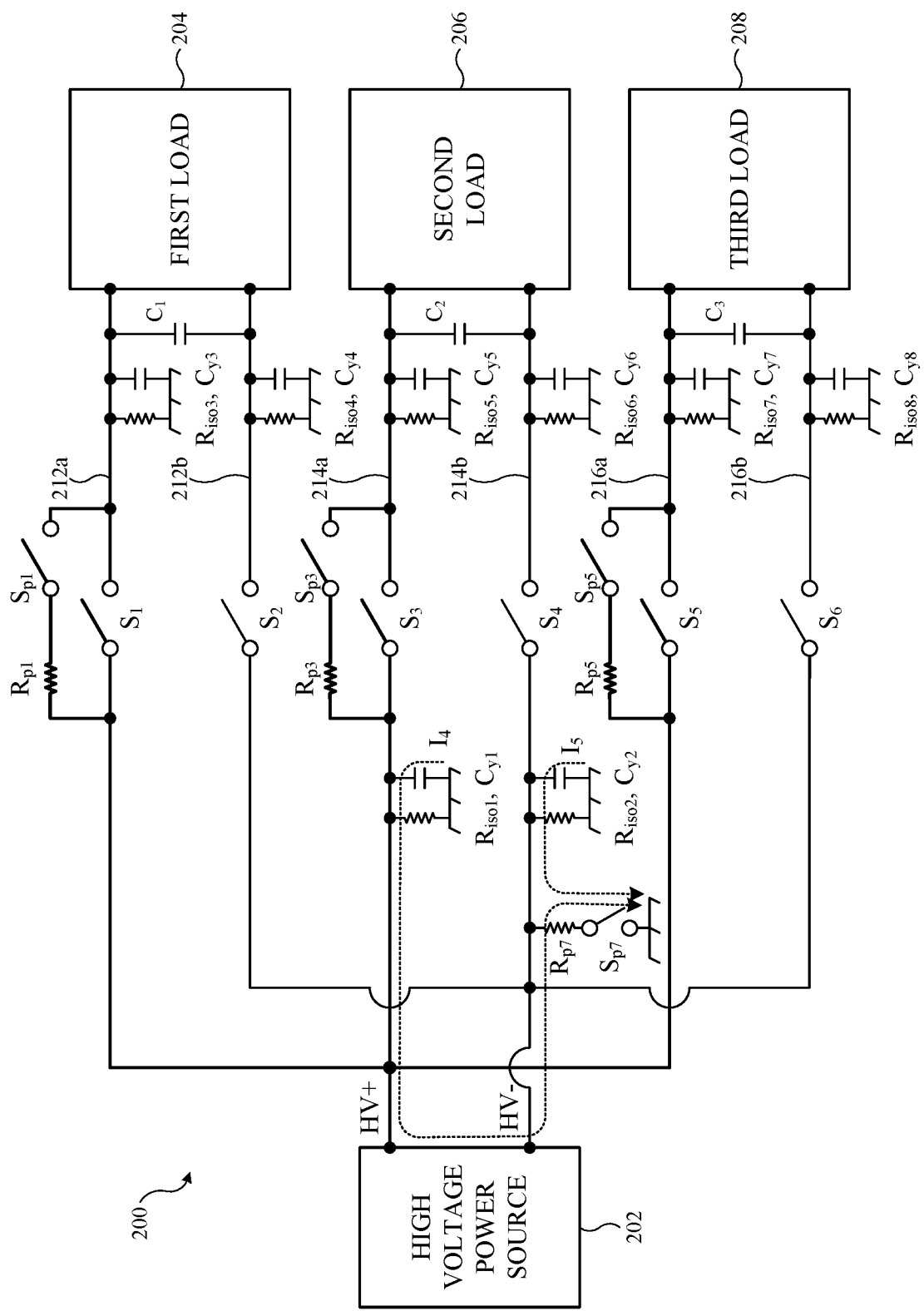
FIG. 2 is a diagram that shows a first example of a configuration for a floating DC system that includes a pre-charge circuit according to the present disclosure.

FIG. 2 is a diagram that shows a system 200, which is a first example of a configuration for a floating DC system that includes a pre-charge circuit according to the present disclosure. The system 200 includes a high-voltage power source 202, a first load 204, a second load 206, and a third load 208. The high-voltage power source 202 outputs electrical power using a positive high-voltage power rail HV+ and a negative high-voltage power rail HV−.

Each of the first load 204, the second load 206, and the third load 208 is connected to the positive high-voltage power rail HV+ and the negative high-voltage power rail HV− by an independent power bus. By way of the independent power buses, the first load 204, the second load 206, and the third load 208 are connected to the positive high-voltage power rail HV+ and the negative high-voltage power rail HV− in parallel. It should be understood that three loads and buses are shown as an example, and any number of loads and buses could be included.

A first power bus includes a first positive bus 212a and a first negative bus 212b and connects the first load 204 to the positive high-voltage power rail HV+ and the negative high-voltage power rail HV−. A second power bus includes a second positive bus 214a and a second negative bus 214b and connects the second load 206 to the positive high-voltage power rail HV+ and the negative high-voltage power rail HV−. A third power bus includes a third positive bus 216a and a third negative bus 216b and connects the third load 208 to the positive high-voltage power rail HV+ and the negative high-voltage power rail HV−.

The power buses allow the supply of power to each of the first load 204, the second load 206, and the third load 208 to be controlled independently. To control supply of power to the first load 204, the first positive bus 212a includes a supply switch $S_1$ that is connected to the positive high-voltage power rail HV+ and the first negative bus 212b includes a supply switch $S_2$ that is connected to the negative high-voltage power rail HV−. To control supply of power to the second load 206, the second positive bus 214a includes a supply switch $S_3$ that is connected to the positive high-voltage power rail HV+ and the second negative bus 214b includes a supply switch $S_4$ that is connected to the negative high-voltage power rail HV−. To control supply of power to the third load 208, the third positive bus 216a includes a supply switch $S_5$ that is connected to the positive high-voltage power rail HV+ and the third negative bus 216b includes a supply switch $S_6$ that is connected to the negative high-voltage power rail HV−. Thus, the system 200 includes loads that are connected to respective power buses such that the load receives electrical power from the source when the corresponding positive power supply switch and the corresponding negative power supply switch are in their closed positions. The power buses are each switchable between an activated state in which the corresponding load receives electrical power from the source and a deactivated state in which the corresponding load does not receive the electrical power from the source.

The system 200 is a floating DC system that does not include a direct path to ground. High impedance paths to ground are present on both sides of the supply switches $S_1$-$S_6$. The positive bus HV+ has an isolation resistance $R_{iso1}$ and a parasitic capacitance $C_{y1}$. The negative bus HV+ has an isolation resistance $R_{iso2}$ and a parasitic capacitance $C_{y2}$. The first positive bus 212a has an isolation resistance $R_{iso3}$ and a parasitic capacitance $C_{y3}$. The first negative bus 212a has an isolation resistance $R_{iso4}$ and a parasitic capacitance $C_{y4}$. The second positive bus 212a has an isolation resistance $R_{iso5}$ and a parasitic capacitance $C_{y5}$. The second negative bus 212a has an isolation resistance $R_{iso6}$ and a parasitic capacitance $C_{y6}$.

The first load 204, the second load 206, and the third load 208 have capacitances $C_1$-$C_3$. Thus, pre-charging is needed to initialize the first bus, the second bus, and the third bus before connecting them to the high-voltage power source 202. To initialize each of these independent buses, pre-charge circuits are used.

Due to the parasitic Y-capacitances $C_{y1}$-$C_{y8}$ and the isolation resistances $R_{iso1}$-$R_{iso8}$, Y-capacitance pre-charge circuits are used to equalize the voltage potential of these capacitors. For the first positive bus 212a, a pre-charge resistor $R_{p1}$ and a pre-charge switch $S_{p1}$ are connected in series with one another and connected upstream and downstream of and in parallel with the supply switch $S_1$ that connects and disconnects the first load 204 with respect to the positive high-voltage power rail HV+. Thus, the pre-charge resistor $R_{p1}$ and the pre-charge switch $S_{p1}$ define a first pre-charge circuit portion that is configured to equalize a voltage across the supply switch $S_1$ between the high-voltage power source 202 and the Y-capacitance $C_1$ that is associated with the first load 204. For the first negative bus 212b, the system 200 omits a pre-charge circuit portion that is connected in parallel with the supply switch $S_2$ that connects and disconnects the first load 204 with respect to the negative high-voltage power rail HV−. Similar components are included in (and omitted from) the second bus and the third bus, including pre-charge resistors $R_{p3}$ and $R_{p5}$ and pre-charge switches $S_{p3}$ and $S_{p5}$.

Voltage differences caused by Y-capacitances associated with the power rail (i.e., the positive high-voltage power rail HV+ and the negative high-voltage power rail HV−) are equalized by a second pre-charge circuit portion that defines a switched path to ground from the negative high-voltage power rail HV−. In the illustrated example, the second pre-charge circuit portion includes a pre-charge resistor $R_{p7}$ and a pre-charge switch $S_{p7}$. The pre-charge switch $S_{p7}$ can be controlled between open (disconnected) and closed (connected) positions, where the closed position allows current flow to ground and the disconnected position lacks current flow to ground. When the pre-charge switch is closed, current flows from capacitances $C_{y1}$ and $C_{y2}$ to ground, with current flowing along a fourth current path $I_4$ from the parasitic capacitance $C_{y1}$, flowing through the high-voltage power source 202 to the second pre-charge circuit portion (pre-charge resistor $R_{p7}$ and a pre-charge switch $S_{p7}$) and with current flowing along a fifth current path $I_5$ from the parasitic capacitance $C_{y2}$ to the second pre-charge circuit portion (pre-charge resistor $R_{p7}$ and a pre-charge switch $S_{p7}$).

To pre-charge the Y-capacitances, the second pre-charge circuit portion, including the pre-charge switch $S_{p7}$, is controlled (i.e., by controlling movement of the switch between open and closed positions) to equalize voltages associated with capacitances on the power rail. In particular, the pre-charge switch $S_{p7}$ is closed to bring the voltage potential of $C_{y2}$ close to ground. The control exercised over the pre-charge switch $S_{p7}$ directly equalizes the voltage potential across Y-capacitance $C_{y2}$ close to ground, which is similar to the Y-capacitances ($C_{y4}$, $C_{y6}$, $C_{y8}$) of the first load 204, the second load, 206, and the third load 208. The negative power supply switches $S_2$, $S_4$, $S_6$ are closed once the voltage potential across $C_{y2}$ is close to ground.

After the negative power supply switches $S_2$, $S_4$, $S_6$ are closed, the pre-charge switches $S_{p1}$, $S_{p3}$, and $S_{p5}$ are closed to equalize the voltages associated with the Y-capacitances before closing the positive power supply switches $S_1$, $S_3$, and $S_5$.

In the system 200, each of the power buses includes a single pre-charge circuit portion across one of its power supply switches (e.g., the positive power supply switches $S_1$, $S_3$, and $S_5$ in the illustrated example) and switched path to ground (including a pre-charge resistor $R_{p7}$ and a pre-charge switch $S_{p7}$). The negative power buses 112b, 114b, 116b of the system 200 omit pre-charge switches across the negative power supply switches $S_2$, $S_4$, and $S_6$.

To summarize the foregoing, the system 200 is A DC floating system that includes a pre-charge circuit that defines a switched path to ground. The switched path to ground connects the negative high-voltage power rail to ground in order to equalize the voltage associated with the Y-capacitance. The pre-charge circuit includes a first pre-charge circuit portion that is configured to equalize a voltage across the positive power supply switch between the source and a Y-capacitance of the load and a second pre-charge circuit portion that defines a switched path to ground that is configured to equalize a voltage associated with a Y-capacitance of the negative power rail before closing the negative power supply switches.

It should be understood that, in an alternative implementation, the pre-charge circuit of the system 200 can be configured such that switched path to ground connects the positive high-voltage power rail to ground in order to equalize the voltage associated with the Y-capacitance. In such an implementation pre-charge circuit portions are connected in parallel relative to the negative power supply switches $S_2$, $S_4$, $S_6$ and are connected upstream and downstream with respect to them.

Figure 3:
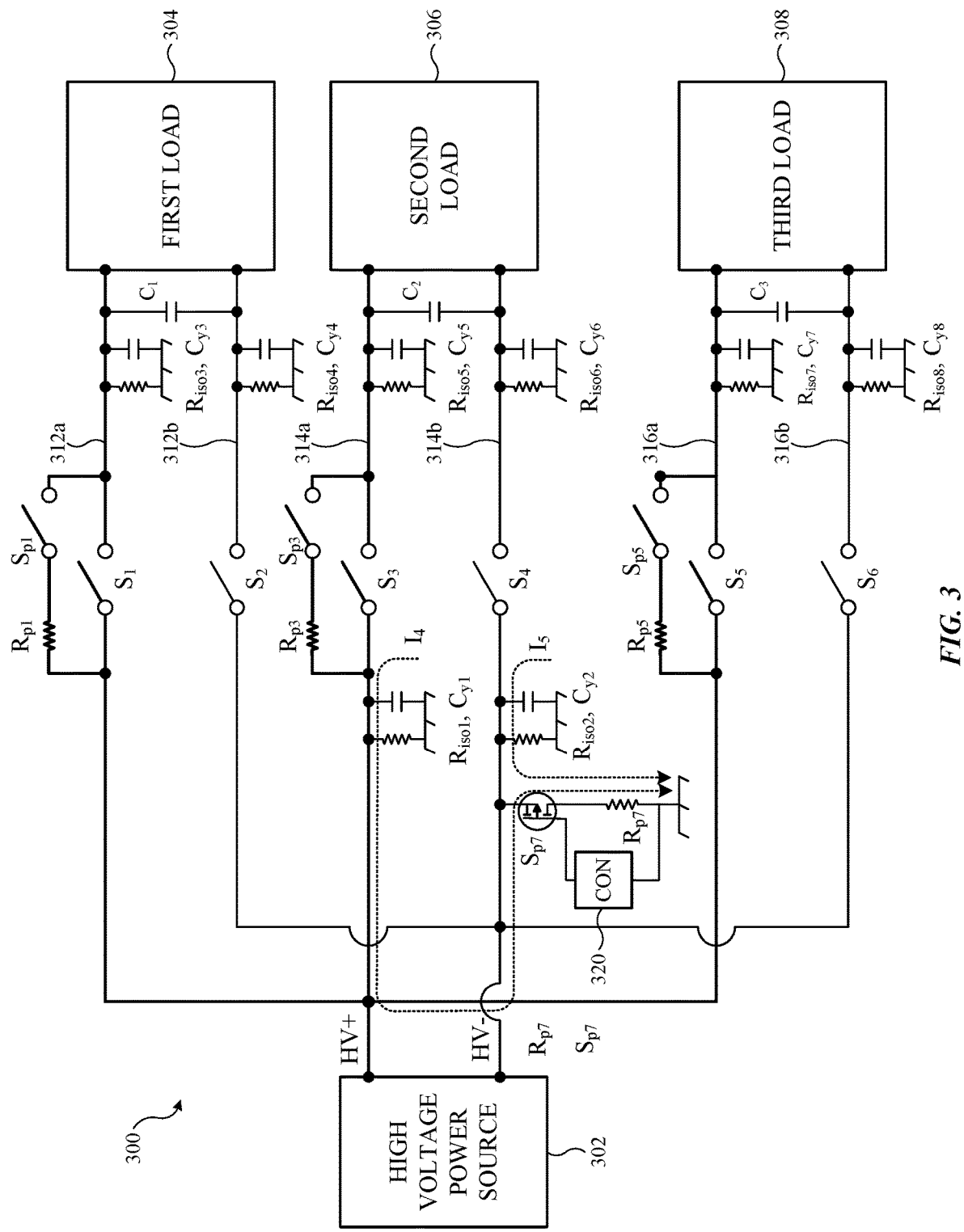
FIG. 3 is a diagram that shows a second example of a configuration for a floating DC system that includes a pre-charge circuit according to the present disclosure.

FIG. 3 is a diagram that shows a system 300, which is a second example of a configuration for a floating DC system that includes a pre-charge circuit according to the present disclosure. The system 300 is similar to the system 200 and includes the components described with respect to the system 200 except as otherwise described herein. The system 300 includes a high-voltage power source 302, a first load 304, a second load 306, and a third load 308, and distributes electrical power to them from the high-voltage power source 302 using a positive high-voltage power rail HV+ and a negative high-voltage power rail HV− through a first power bus defined by a first positive bus 312a and a first negative bus 312b, a second power bus defined by a second positive bus 314a and a second negative bus 314b, and a third power bus defined by a third positive bus 316a and a third negative bus 316b. It should be understood that three loads and buses are shown as an example, and any number of loads and buses could be included.

A first pre-charge circuit portion is defined in parallel to each of the positive power supply switches $S_1$, $S_2$, and $S_3$, with each including a respective pre-charge switch $S_{p1}$, $S_{p3}$, $S_{p5}$ and a respective pre-charge resistor $R_{p1}$, $R_{p2}$, $R_{p3}$.

In contrast to the system 200, a second pre-charge circuit portion of the system 300 defines a switched path to ground that includes an active current source that is connected between the high-voltage positive power rail HV+ to minimize the potential difference to ground potential. The active current source includes a controller 320 that applies current through control of a switch $S_{p7}$ (e.g., a transistor) that is arranged in series with a resistor $R_{p7}$. The controller 320 measures current across the resistor $R_{p7}$ and controls operation of the switch $S_{p7}$ (i.e., drive between open and closed positions) based on the voltage across the resistor $R_{p7}$ and adjusting the switch drive according to the measured voltage. This arrangement acts as a variable resistor and allows the voltage across the capacitance $C_{y2}$ to be pre-charged to a value that is close to zero. Current may flow along current paths 14 and 15 from the capacitances $C_{y1}$ and $C_{y2}$ to the active current source.

Figure 4:
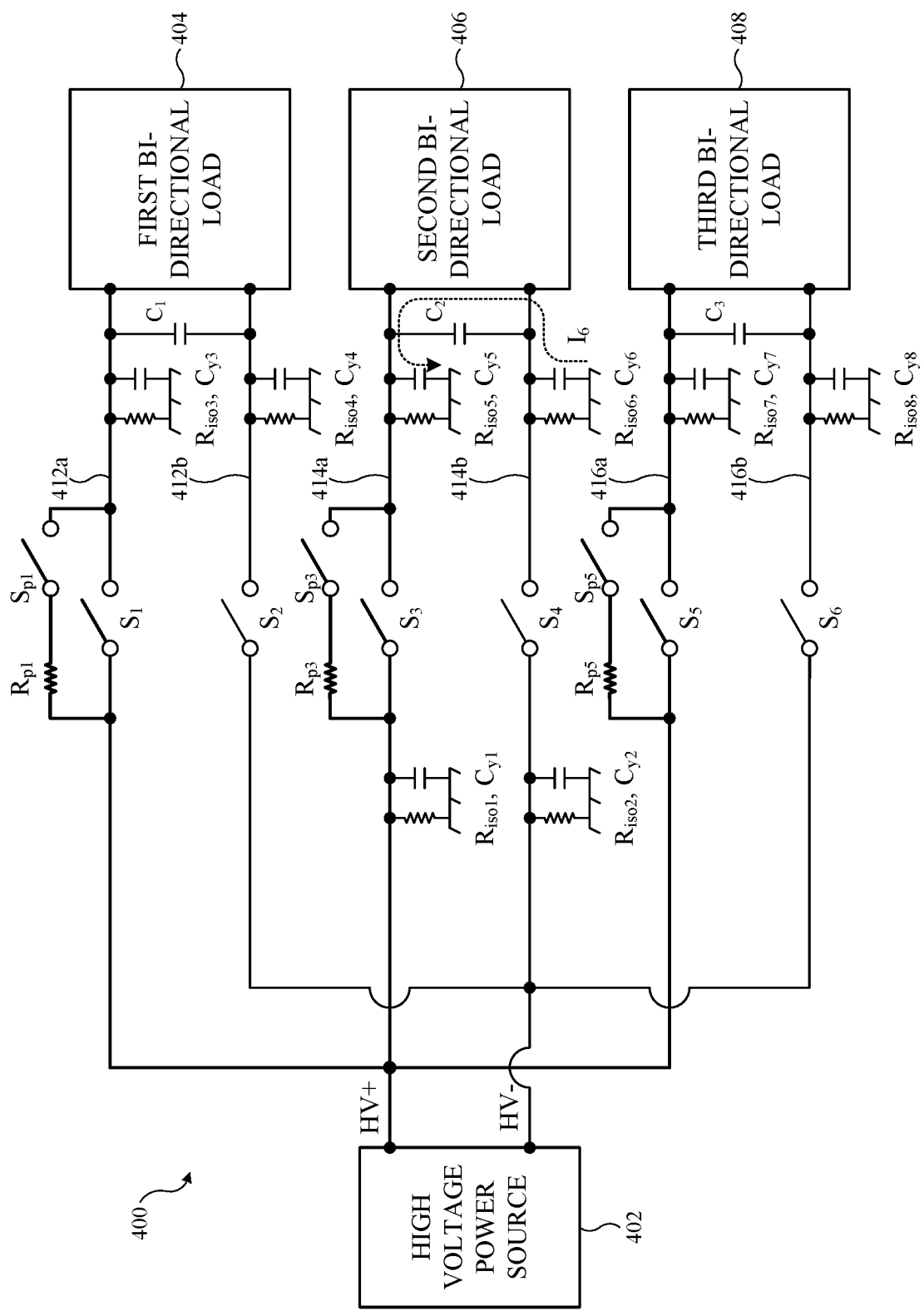
FIG. 4 is a diagram that shows a third example of a configuration for a floating DC system that includes a pre-charge circuit according to the present disclosure.

FIG. 4 is a diagram that shows a system 400, which is a second example of a configuration for a floating DC system that includes a pre-charge circuit according to the present disclosure. The system 400 is similar to the system 200 and includes the components described with respect to the system 200 except as otherwise described herein. The system 400 includes a high-voltage power source 402, a first bi-directional load 404, a second bi-directional load 406, and a third bi-directional load 408, and distributes electrical power to them from the high-voltage power source 402 using a positive high-voltage power rail HV+ and a negative high-voltage power rail HV− through a first power bus defined by a first positive bus 412a and a first negative bus 412b, a second power bus defined by a second positive bus 414a and a second negative bus 414b, and a third power bus defined by a third positive bus 416a and a third negative bus 416b. It should be understood that three loads and buses are shown as an example, and any number of loads and buses could be included.

A first pre-charge circuit portion is defined in parallel to each of the positive power supply switches $S_1$, $S_2$, and $S_3$, with each including a respective pre-charge switch $S_{p1}$, $S_{p3}$, $S_{p5}$ and a respective pre-charge resistor $R_{p1}$, $R_{p2}$, $R_{p3}$ The system 400 omits a switched path to ground. Instead, the system 400 utilizes the bi-directional nature of the first bi-directional load 404, the second bi-directional load 406, and the third bi-directional load 408, which are able to output high-voltage electrical power, to allow current to flow along a sixth current flow path $I_6$. With reference to the second power bus and the second bi-directional load 406, the second bi-directional load is controlled such that current flows from the parasitic capacitance $C_{y6}$ on the second negative bus 414b to the parasitic capacitance $C_{y5}$ on the second positive bus 414a. The voltage across the parasitic capacitance $C_{y5}$ of the second positive bus 414a is to be monitored and compared to the parasitic capacitance $C_{y2}$ of the negative high-voltage power rail HV− and the voltage across the second bi-directional load 406 is controlled and continuously adjusted until the two voltages are sufficiently close (e.g., within a threshold value of one another).

To summarize the foregoing, operation of the system 400 includes a method for operating a high-voltage DC floating system. The method includes controlling operation of a bi-directional load (e.g., the second bi-directional load 406) to equalize a voltage across a power supply switch (e.g., the negative power supply switch $S_4$) between a source and a Y-capacitance of the bi-directional load while the power supply switch is in an open position, determining that the Y-capacitance of the bi-directional load has dropped below a threshold value, and moving the power supply switch from the open position to a closed position in which electrical power is supplied to the load from a source in response to determining that the Y-capacitance of the bi-directional load has dropped below the threshold value.

It should be understood that the system 400 may also be implemented such that the pre-charge circuits are arranged in parallel with respect to the negative power supply switches $S_2$, $S_4$, $S_6$ of the first negative bus 112b, the second negative bus 114b, and the third negative bus 116b.

The systems described above are applicable generally to high-voltage DC floating systems. As an example, the systems described herein may be applied in the context of electric vehicle systems, including battery charging systems and propulsion systems. It should be understood, however, that the systems described herein are applicable to many types of high-voltage DC floating systems and are not limited to use in any particular type of system.

What is claimed is:

1. A high-voltage DC floating system, comprising:
a power source;
a positive power rail that is connected to the power source;
a negative power rail that is connected to the power source;
a power bus having a positive bus portion that is connected to the positive power rail and a negative bus portion that is connected to the negative power rail, wherein the positive bus portion of the power bus includes a positive power supply switch that has an open position and a closed position, and the negative bus portion of the power bus includes a negative power supply switch that has an open position and a closed position;
a load that is connected to the power bus such that the load receives electrical power from the power source when the positive power supply switch and the negative power supply switch are in their closed positions; and
a pre-charge circuit that includes a first pre-charge circuit portion that is configured to equalize a voltage across the positive power supply switch between the power source and a Y-capacitance of the load and a second pre-charge circuit portion that defines a switched path to ground that is configured to equalize a voltage associated with a Y-capacitance of the negative power rail by directly connecting the power bus to a ground.

2. The high-voltage DC floating system of claim 1, wherein the first pre-charge circuit portion includes a first pre-charge resistor that is connected in series with a first pre-charge switch.

3. The high-voltage DC floating system of claim 1, wherein the first pre-charge circuit portion is connected to the positive bus portion of the power bus upstream from the positive power supply switch and downstream from the positive power supply switch.

4. The high-voltage DC floating system of claim 1, wherein the switched path to ground is electrically connected to the negative power rail.

5. The high-voltage DC floating system of claim 1, wherein the second pre-charge circuit portion includes a second pre-charge resistor that is connected in series with a second pre-charge switch.

6. The high-voltage DC floating system of claim 1, wherein:
the first pre-charge circuit portion includes a first pre-charge resistor that is connected in series with a first pre-charge switch,
the first pre-charge circuit portion is connected to the positive bus portion of the power bus upstream from the positive power supply switch and downstream from the positive power supply switch,
the switched path to ground is electrically connected to the negative power rail, and
the second pre-charge circuit portion includes a second pre-charge resistor that is connected in series with a second pre-charge switch.

7. The high-voltage DC floating system of claim 1, wherein the second pre-charge circuit portion includes a controller, a current source, a second pre-charge switch, and a second pre-charge resistor, wherein the controller is operable to measure a voltage difference and control the second pre-charge switch to apply electrical current from the current source based on the voltage difference to equalize the voltage associated with the Y-capacitance of the negative power rail.

8. The high-voltage DC floating system of claim 1, wherein the switched path to ground defines a connected state, in which the power bus is connected to the ground, and a disconnected state, in which the power bus is not connected to the ground.

9. The high-voltage DC floating system of claim 1, wherein the negative bus portion omits a switched load path in parallel with the negative power supply switch.

10. The high-voltage DC floating system of claim 1, wherein the switched path to ground equalizes the voltage associated with the Y-capacitance of the negative power rail by allowing current to flow from the negative power rail to a ground.

11. A high-voltage DC floating system, comprising:
a power source;
a power rail that is connected to the power source;
a power bus that is connected to the power rail;
a load that is connected to the power bus, wherein the power bus is switchable between an activated state in which the load receives electrical power from the power source and a deactivated state in which the load does not receive the electrical power from the power source; and
a pre-charge circuit that is operable to equalize a voltage associated with a Y-capacitance of the power rail and includes a switched direct path to ground.

12. The high-voltage DC floating system of claim 11, wherein the switched direct path to ground is electrically connected to the power rail.

13. The high-voltage DC floating system of claim 11, wherein the power rail includes a positive rail portion and a negative rail portion, and the switched direct path to ground is connected to the negative rail portion of the power rail.

14. The high-voltage DC floating system of claim 11, wherein the power rail includes a positive rail portion and a negative rail portion, and the switched direct path to ground is connected to the positive rail portion of the power rail.

15. The high-voltage DC floating system of claim 11, wherein the switched direct path to ground includes a pre-charge resistor that is connected in series with a pre-charge switch.

16. The high-voltage DC floating system of claim 11, wherein the power bus has a positive bus portion and a negative bus portion, the positive bus portion includes a positive power supply switch, and the negative bus portion includes a negative power supply switch.

17. The high-voltage DC floating system of claim 16, wherein the pre-charge circuit includes a first pre-charge circuit portion that equalizes a voltage across the positive power supply switch and a Y-capacitance of the load and a second pre-charge circuit portion that includes the switched direct path to ground.

18. The high-voltage DC floating system of claim 17, wherein the first pre-charge circuit portion includes a first pre-charge resistor that is connected in series with a first pre-charge switch.

19. The high-voltage DC floating system of claim 18, wherein the first pre-charge circuit portion is connected to the positive bus portion of the power bus upstream from the positive power supply switch and downstream from the positive power supply switch.

20. The high-voltage DC floating system of claim 19, wherein the second pre-charge circuit portion includes the switched direct path to ground, and the switched direct path to ground is electrically connected to the power rail.

21. The high-voltage DC floating system of claim 20, wherein the switched direct path to ground includes a second pre-charge resistor that is connected in series with a second pre-charge switch.

22. A high-voltage DC floating system, comprising:
a power source;
a power rail that is connected to the power source;
a power bus that is connected to the power rail;
a load that is connected to the power bus, wherein the power bus is switchable between an activated state in which the load receives electrical power from the power source and a deactivated state in which the load does not receive the electrical power from the power source; and
a pre-charge circuit that is operable to equalize a voltage associated with a Y-capacitance of the power rail and includes a switched direct path to ground, wherein the switched direct path to ground includes a controller, a current source, a second pre-charge switch, and a second pre-charge resistor, wherein the controller is operable to measure a voltage difference and control the second pre-charge switch to apply electrical current from the current source based on the voltage difference to equalize the voltage associated with the Y-capacitance of the power rail.

23. A method for operating a high-voltage DC floating system, comprising:
controlling operation of a bi-directional load to equalize a voltage across a power supply switch between a power source and a Y-capacitance of the bi-directional load while the power supply switch is in an open position;
determining that the Y-capacitance of the bi-directional load has dropped below a threshold value; and
moving the power supply switch from the open position to a closed position in which electrical power is supplied to the bi-directional load from the power source in response to determining that the Y-capacitance of the bi-directional load has dropped below the threshold value.

* * * * *